United States Patent [19]
Piliavin et al.

[11] 4,256,382
[45] Mar. 17, 1981

[54] LIQUID CRYSTAL DEVICES HAVING UNIFORM THERMAL EXPANSION COEFFICIENT COMPONENTS

[75] Inventors: Michael A. Piliavin, Encino; Geza Csanky, Sepulveda, both of Calif.

[73] Assignee: Hughes Aircraft Company, Culver City, Calif.

[21] Appl. No.: 35,679

[22] Filed: May 3, 1979

[51] Int. Cl.³ .............................. G02F 1/133
[52] U.S. Cl. .................... 350/334; 350/344
[58] Field of Search ............... 350/334, 336, 344

[56] References Cited

U.S. PATENT DOCUMENTS

| | | | |
|---|---|---|---|
| 3,861,783 | 1/1975 | Dill et al. | 350/334 |
| 3,863,332 | 2/1975 | Leupp et al. | 350/344 X |
| 3,877,790 | 4/1975 | Robinson | 350/344 |

*Primary Examiner*—Edward S. Bauer
*Attorney, Agent, or Firm*—Lawrence V. Link, Jr.; W. H. MacAllister

[57] ABSTRACT

A liquid crystal cell for use in a display and a method for manufacturing such display is disclosed. Each cell of such display includes a membrane which is manufactured by conventional semiconductor processing technology. Such membrane has semiconductor structural support members between which liquid crystal fluid is retained. Such membrane and residual liquid crystal fluid in the cell have substantially the same thermal coefficient of expansion as a silicon integrated circuit chip attached to the rib members. The membrane prevents warpage and deterioration of each liquid crystal cell, maintains uniformity of spacing between structural members of the cell, and enables a high quality cell to be fabricated with accompanying improved cell fabrication yield.

10 Claims, 18 Drawing Figures

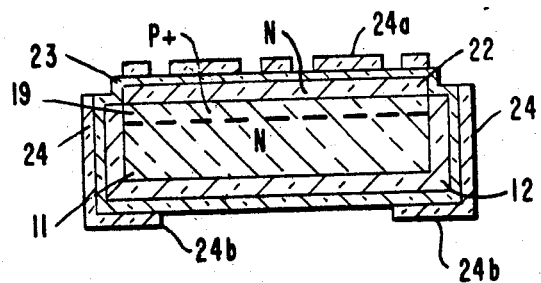
Fig. 10.
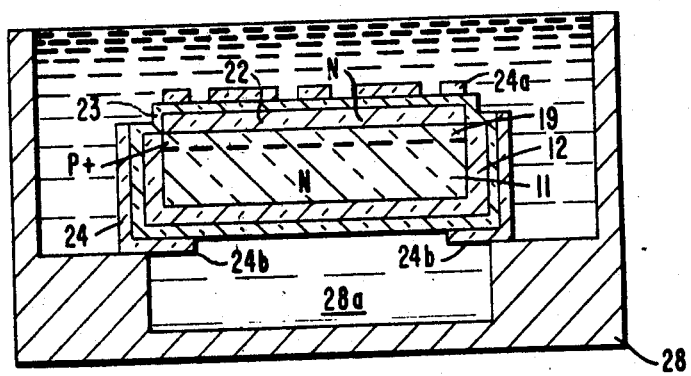
Fig. 11.
Fig. 18
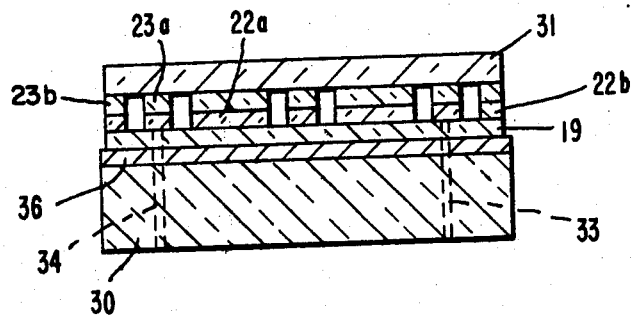

LIQUID CRYSTAL DEVICES HAVING UNIFORM THERMAL EXPANSION COEFFICIENT COMPONENTS

TECHNICAL FIELD

This invention relates to the field of liquid crystal devices such as, for example, those used in displays for alpha-numeric readout purposes.

BACKGROUND ART

Liquid crystal devices (or displays for digital or alpha-numeric readout components) are extensively utilized in the electronic field, where such devices may be an integral part of the electronic equipment.

For example, in the prior art a liquid crystal cell made by conventional semiconductor fabrication process is generally combined with an integrated circuit silicon chip that acts as a substrate for the liquid crystal cell. Such a chip has conductive layers embedded in its inner surface and these layers act as electrodes for making electrical connection between the integrated circuit of the chip and electrical circuits external to the cell. A glass faceplate having a transparent layer of indium-tin-oxide attached thereto, faces the surface of the chip in which the electrodes are embedded. Supports at the edges of the cell are provided to separate the glass faceplate and chip, and conventional liquid crystal fluid is used to fill the spacing between the chip and faceplate.

Major disadvantages of the prior art cell are the different thermal expansion rates of the integrated circuit chip material and the liquid crystal fluid. Such different thermal expansion rates result in warpage of the liquid crystal cell due to the different changes in dimensions of the cell materials.

These different thermal expansion rates also are responsible for failure of the cell to maintain the required dimensional tolerances of its several structural parts, and results in a generally inferior cell quality as well as a low cell manufacture yield.

Another disadvantage of prior art cell is the absence of adequate support structure throughout the cell area. Such lack of support structure enables the different cell components to independently expand at their differing thermal expansion rates and further results in poor cell quality as well as relatively rapid cell deterioration and warpage with time. Due to the absence of adequate internal cell support structure, no isolation or distinct lines of demarcation between the cell's picture areas are provided, resulting in a certain amount of cross-talk between such picture areas, and also contributing to reduction in the cell's picture resolution capabilities.

SUMMARY OF THE INVENTION

Hence, an objective of this invention is to devise a liquid crystal cell which will not warp or deteriorate with time.

Another objective of the invention is to provide structural support members throughout the cell in areas containing the liquid crystal fluid, thereby constraining cell deformation and warpage by virtue of these support members.

Still another objective of this invention is to enable the fabrication of a liquid crystal cell, all the components of which will substantially maintain their specified dimensional tolerances, thereby increasing cell fabrication quality and cell yield.

A further objective of this invention is to reduce cross-talk between individual picture elements of the cell, by virtue of the presence of rib support structural members defining discrete cell areas and isolating individual picture elements, and thereby improving the cell's picture resolution capabilities.

Yet another objective of this invention is to utilize a membrane with a rib support structure integral therewith, interposed between the cell's faceplate and the integrated circuit semiconductor chip, so as to match the thermal expansion of the combination of the membrane and liquid crystal fluid to the thermal expansion of the semiconductor material of the chip.

Accordingly, a silicon type, generally planar member infused with boron of a specified concentration level, provides an adequate substrate for the membrane. Epitaxial layers of silicon having silicon dioxide surfaces, form a rib structure as an integral part of the membrane substrate in accordance with a predetermined pattern. The silicon dioxide surfaces of the rib structure interface with the integrated circuit semiconductor chip and act as standoff members and electrically insulating means between the membrane and the interfacing surface of the semiconductor material of the chip. Spaces between the rib structure retain the liquid crystal fluid, and such spaces permit external light to pass through cell areas except at locations occupied by the rib structure, which rib structure is opaque to such external light. The cell has an optically transparent faceplate with a transparent indium-tin-oxide coating on one surface, which indium-tin-oxide coating interfaces with the substrate of the membrane that is opposite to the surface having the rib structure. Such indium-tin-oxide coating provides a common electrical ground plane of the circuitry of the chip. Such indium-tin-oxide coating is optional since individual ground connections may be made directly from the chip itself.

The membrane therefore includes a silicon substrate of one conductivity type and a rib structure of another conductivity type. The silicon type rib structure, attached to the silicon type chip material, occupies a portion of the cell area formerly occupied by the liquid crystal fluid. The liquid crystal fluid occupies only the spaces or areas between the rib structure. Since the thermal expansion coefficient of the liquid crystal fluid is greater than that of the silicon material at the chip with which it interfaces, reduction of the quantity of such fluid and substitution of silicon material in terms of the rib structure, provides a closer match of thermal coefficients between the combination of membrane and decreased fluid quantity and the silicon material of the integrated circuit chip.

Use of such membrane therefore has the effect of resolving all the above stated problems and disadvantages of the prior art liquid crystal cells, and providing the above stated objectives.

Specifically, the rib structure of the membrane provides discrete lines of demarcation, and hence isolation of the picture elements, so as to decrease cross-talk between such picture elements and to increase picture resolution capability. Additionally, the uniform expansion of the cell components guarantees high manufacturing yield and maintenance of the requisite cell dimensional tolerances. Still further, such rib structure constrains cell component expansion, prevents cell warpage and deformation and inhibits cell deterioration with time.

In fabricating the cell components, the inventive silicon membrane is made by a combination of ethylene-diamine etching and diffusion of boron impurities into a silicon substrate to provide a layer on the substrate having a specified boron concentration in excess of $3 \times 10^{19}$ atoms/cm$^3$. Since ethylene-diamine solution will not etch silicon with boron concentrations in excess of $3 \times 10^{19}$/cm$^3$, fabrication of the silicon membrane is made possible. Such boron-diffused silicon substrate has excellent light transmission characterstics.

After the boron is diffused into the silicon substrate, an epitaxial layer of N-type silicon material with doping of less than $10^{18}$ atoms/cm$^3$, is grown on top of the boron diffused silicon substrate. This type of epitaxial growth on top of diffused layers is common to integrated circuit manufacture.

After epitaxial growth, a film of silicon is oxidized on the surface of the epitaxial layer, forming a silicon dioxide coating thereon. Using photolithography followed by ethylene-diamine etching, a rib pattern is formed in the epitaxial layer having a silicon dioxide coating, which acts as standoff means within the cell with respect to the integrated circuit chip to which the rib structure is attached. Each portion of the rib pattern members therefore has such a silicon dioxide coating so as to provide electrical insulation between the chip and a common ground plane electrode, when such is used.

After the last etch step is complete, the membrane is bonded to a glass substrate having an electrically conductive film which constitutes the common ground plane electrode, when used, and the display cell is assembled in the usual manner.

BRIEF DESCRIPTION OF THE DRAWINGS

FIG. 10 is a cross section view of the cell shown in FIG. 9, wherein portions of an outer layer had been removed by developing such portions as have been exposed to the ultra-violet light.

FIG. 11 is a cross section view of the structure of FIG. 10 immersed in another hydrogen fluoride bath containing ammonium-bifluoride which etches certain areas of the cell structure.

FIG. 18 is a cross section view of the cell shown in FIGS. 16 and 17, having an additional circumferential lip used for sealing the cell.

DETAILED DESCRIPTION OF THE INVENTION

A novel liquid crystal display is comprised of an array of liquid crystal cells wherein each cell has a silicon type membrane which provides improved cell quality and performance. Such a cell may be fabricated utilizing semiconductor processing techniques. Fabrication of such cell of the display, is achieved by the following manufacturing process steps.

Figure 1:
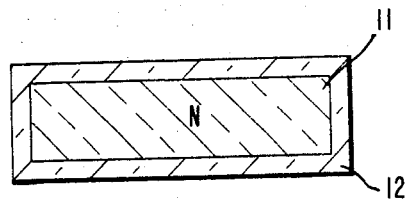
FIG. 1 is a cross section view of a silicon substrate showing a coating of silicon dioxide thereover.

Referring to FIG. 1, a silicon semiconductor substrate of N-type material 11 is coated with a silicon dioxide layer 12, which layer is thermally grown by methods well known in the art. Such silicon dioxide layer completely surrounds the substrate. Substrate material 11 is cut or cleaved either along the 100 or 110 plane from larger bulk silicon material. It should however be noted that although the N-type material is used as substrate 11, P-type material may be used equally effectively when other layers of silicon materials having different conductivities than stated below, are used. It is also noted that the figures are shown in cross section for ease in understanding the process and that the substrate and the silicon dioxide layer as well as the cell itself may generally be of circular configuration.

Figure 2:
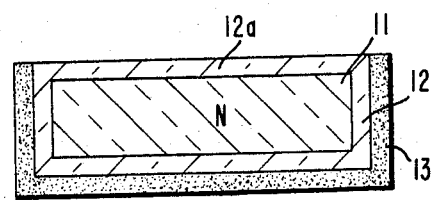
FIG. 2 is a cross section view of the structure of FIG. 1 having an additional layer of wax over the silicon dioxide layer.

As shown in FIG. 2, an etch resistant deposit, such as wax, is shown at 13 which surrounds the configuration of FIG. 1 excepting for the topmost portion of layer 12 which is herein denoted as 12a, and as will be described hereinafter. Such topmost portion 12a will be subsequently removed.

Figure 3:
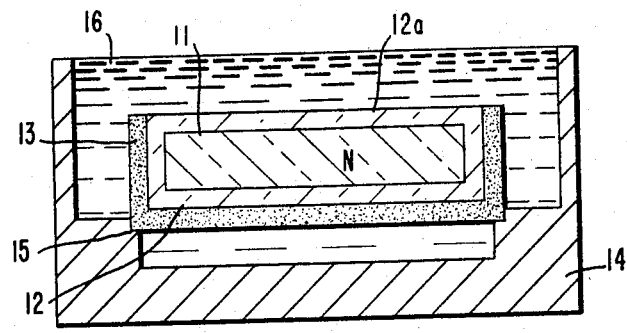
FIG. 3 is a cross section view of the structure of FIG. 2 in a vessel filled with hydrogen fluoride for etching part of the structure.

FIG. 3 shows, the configuration of FIG. 2 deposited in vessel 14. Vessel 14 is generally made of stainless steel and has circumferential groove 15 in its inner wall structure to provide seating capability to the semiconductor liquid crystal cell being processed. Prior to depositing the semiconductor structure in vessel 14, vessel 14 was filled with hydrogen fluoride 16 to a level so as to cover the top surface of 12a. The hydrogen fluoride attacks such surfaces that do not have the etch resistant deposit 13 thereon, such as surface 12a, and will remove same as may be seen from the illustration of FIG. 4.

Figure 4:
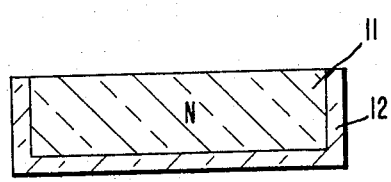
FIG. 4 is a cross section view of the etched structure of FIG. 3 wherein the remaining wax deposit thereon had been removed.

In the operation depicted in FIG. 4, the remaining wax deposit 13 is cleaned off and removed from surface 12 with a suitable cleaner, such as trichloroethylene solution.

Figure 5:
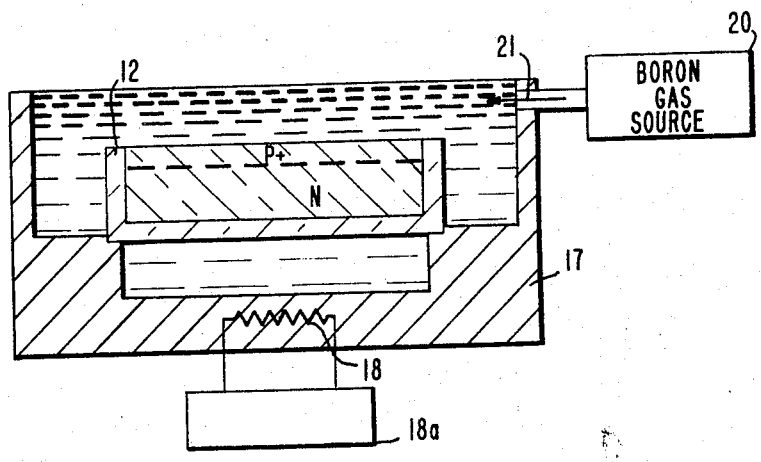
FIG. 5 is a cross section view of the structure of FIG. 4 which is deposited in a vessel so that a surface of such structure may be heated and infused with boron impurities.

Referring to FIG. 5, the semiconductor structure is inserted in furnace 17 wherein such furnace has embedded therein, resistive element 18, which is energized by a conventional AC power source 18a to provide the requisite heat for executing this step. Furnace 17 has as an integral part thereof, a boron gas source 20, which during the process of heating the semiconductor structure, gas 21, containing boron, is passed from source 20 over the exposed surfaces of the semiconductor structure. Such infusion of boron gas into the surface of substrate 11 creates a P+ region 19 in substrate 11 at the top of the semiconductor structure having a boron concentration greater than $3 \times 10^{19}$ atoms/cm$^3$, and hence region 19 will not be subject to attack by the ethylene diamine solution used in later defined steps. Gas 21 consists of a mixture of nitrogen, oxygen and diborane. It is pointed out that infusion of impurities such as boron, into a semiconductor material is old in the art. It is also to be noted that boron gas will not infuse into surfaces which are coated with $SiO_2$, such as coating 12.

Figure 6:
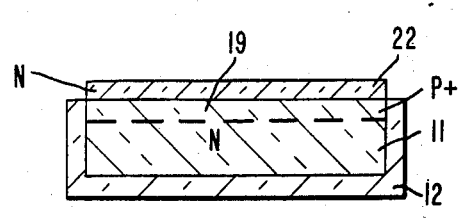
FIG. 6 is a cross section view of the cell structure after it had been removed from the vessel of FIG. 5, wherein an epitaxial silicon layer had been deposited on the boron infused surface.

As shown in FIG. 6, an epitaxial layer 22 of silicon is deposited on surface of P+ material 19 in a manner well known in the art. Epitaxial layer 22 comprises N-type doping material which will have a dopant count of less than $10^{18}$ atoms per cubic centimeter.

Figure 7:
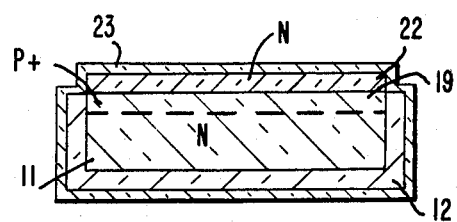
FIG. 7 is a cross section view of the structure of FIG. 6 wherein a silicon dioxide layer had been grown over the surfaces of the cell structure.

Referring to FIG. 7, the surface of the semiconductor structure is oxidized, such as by heating, resulting in silicon dioxide layer 23 surrounding such structure and disposed over layer 22.

Figure 8:
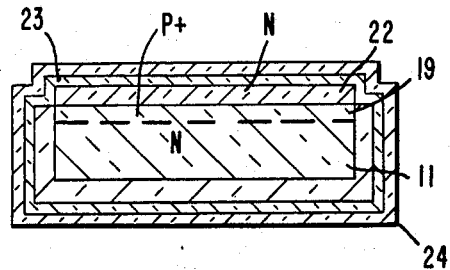
FIG. 8 is a cross section view of the cell of FIG. 7 wherein an additional layer of photoresist material had been deposited over the surfaces of such cell structures.

In the step depicted in FIG. 8, photoresist layer 24 is deposited over layer 23. Such deposition method is performed by steps well known in this art. The deposition of photoresist material may make use of a variety of different types of photoresist materials which are commercially available, one such material being Shipley's Type AZ 1350.

Figure 9:
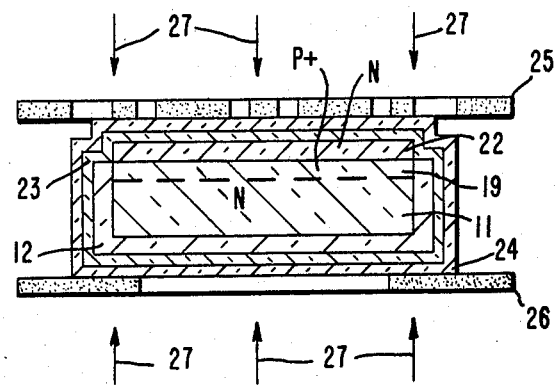
FIG. 9 is a cross section view of the cell shown in FIG. 8, sandwiched between a pair of masks containing desired patterns to be fabricated into the surfaces of the cell structure by exposing such surfaces to ultraviolet light.

Referring to FIG. 9, masks 25 and 26 containing the patterns representing ribs and may have other structural elements of the liquid crystal cell to be produced, are placed in cooperation with layer 24. The patterns will be imprinted into photoresist material 24 by virtue of ultraviolet light 27 which impinges on masks 25 and 26 and penetrates such masks in non-opaque areas thereof as provided by the mask design, and thereby exposes portions of layer 24 to such ultraviolet light. Exposure time of the photoresist layer to ultraviolet light will generally vary between 5 and 7 seconds. Masks 25 and 26 are then removed and the structure is again inserted in a suitable developer bath, well known in the art, so as to develop such portions of layer 24 which have been exposed to the ultraviolet light, such developer bath removing the exposed portions of layer 24.

From FIG. 10, it may be seen that the exposed portions of layer 24 had been removed by the developer bath, thereby leaving portions 24a at the top of the configuration and portions 24b at the bottom thereof as well as the remaining portions of layer 24 at the sides of the structure.

As shown in FIG. 11, the semiconductor structure is immersed in another hydrogen fluoride bath 28a contained within vessel 28, which vessel may be made of stainless steel. The hydrogen fluoride bath also contains a buffering agent such as ammonium bifluoride and water. Such bath etches into layer 23 in areas not protected by portions 24a, until epitaxial layer 22 at the top of the structure has been exposed, and etches through areas at the bottom of the structure which are unprotected by layer portions 24b. Such bath also removes part of the $SiO_2$ of layer 23 so that the bottom of the structure will expose a part of substrate 11.

Figure 12:
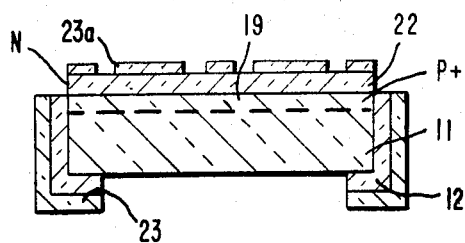
FIG. 12 is a cross section view of the structure which had been removed from the etching bath of FIG. 11 showing the effect of the etching step performed upon the cell.

Referring to FIG. 12, the structure as etched in the process step of FIG. 11, shows that epitaxial layer 22 had been reached at the top of the structure, and that substrate 11 had been reached at the bottom of the structure. Accordingly, part of layer 22 is now exposed at the top of the structure, and part of substrate 11 is exposed at the bottom of the structure. Layer portions 24, 24a and 24b had been removed by a suitable solvent, such as acetone after completion of the preceding etching step shown in FIG. 11.

Figure 13:
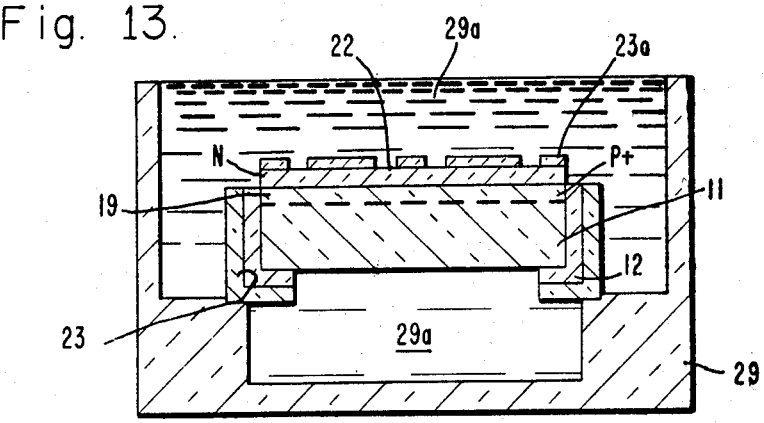
FIG. 13 is a cross section view of the cell of FIG. 12 immersed in still another etch solution of ethylene-diamine.

As illustrated in FIG. 13, the structure as in FIG. 12 is then immersed in an ethylene-diamine etch solution 29a, consisting of 190 milliliters of ethylene-diamine, 32.5 grams of pyrocathecol, and 90 milliliters of water. Such etch is contained in glass vessel 29. The ethylene-diamine etch solution will now etch the surfaces of substrate 11 which are exposed, as well as the exposed surface of epitaxial layer 22. The etch will eat away the exposed surfaces of layer 22 until the P+ layer 19 has been reached. Likewise such etching solution will eat away virtually all portions of substrate 11 except those portions protected by what remains of layers 12, 23 and 23a on the sides and the top of the structure. The etching solution 29a will not attack the P+ layer since it has a boron concentration in excess of $3 \times 10^{19}$ atoms per cubic centimeter and is impervious to reaction with ethylene-diamine etch solution.

Figure 14:
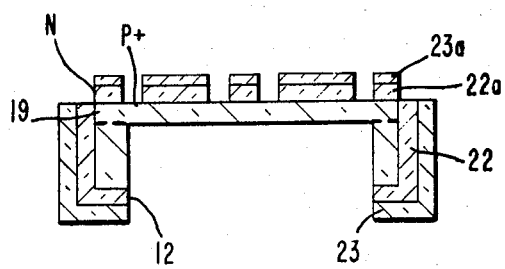
FIG. 14 is a cross section view of the structure treated with the ethylene-diamine solution showing the removal of certain portions of layers of the cell structure including removal of the major portion of the silicon substrate originally used and as shown in FIG. 1.

Referring to FIG. 14, the resultant structure due to the preceding step of FIG. 13, shows the removal of much of the original substrate 11, and removal of parts of epitaxial layer 22 not protected by layer portions 23a. Hence, portions 23a will remain at the top of the structure and part of the original layer 23 at the bottom and sides thereof, and layer portions 22a will be created at the top of the structure.

Figure 15:
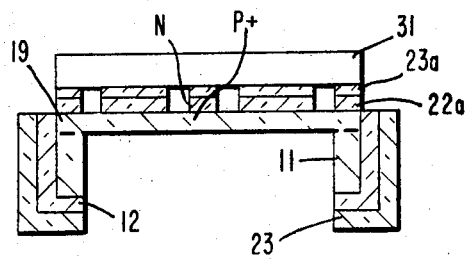
FIG. 15 is a cross section view of the structure of FIG. 14 wherein additionally a silicon chip having integrated circuitry is attached to the cell structure.

Referring to FIG. 15, the etched structure of FIG. 14 will be integrated with a silicon chip 31 which may contain various types of integrated circuitry that function in conjunction with the liquid crystal display. However, the chip circuitry is not per se a part of the invention, but illustrates the invention utilization, and hence details thereof need not be specified. Such chip may be cemented to the surfaces of portions 23a, or otherwise attached thereto by methods well known in this art.

Figure 16:
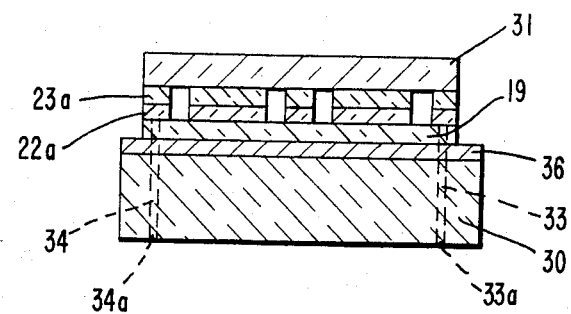
FIGS. 16 and 17 are respectively cross-section and perspective views of the cell structure shown in FIG. 15, wherein certain remaining silicon layers on the sides of the cell structure had been removed. Plane 16-16 of FIG. 17 illustrates the cross-section view taken at FIG. 17 as seen in FIG. 16 except that FIG. 16 also shows the silicon chip attached to the top of the device. Such figures also show the completed cell.
Figure 17:
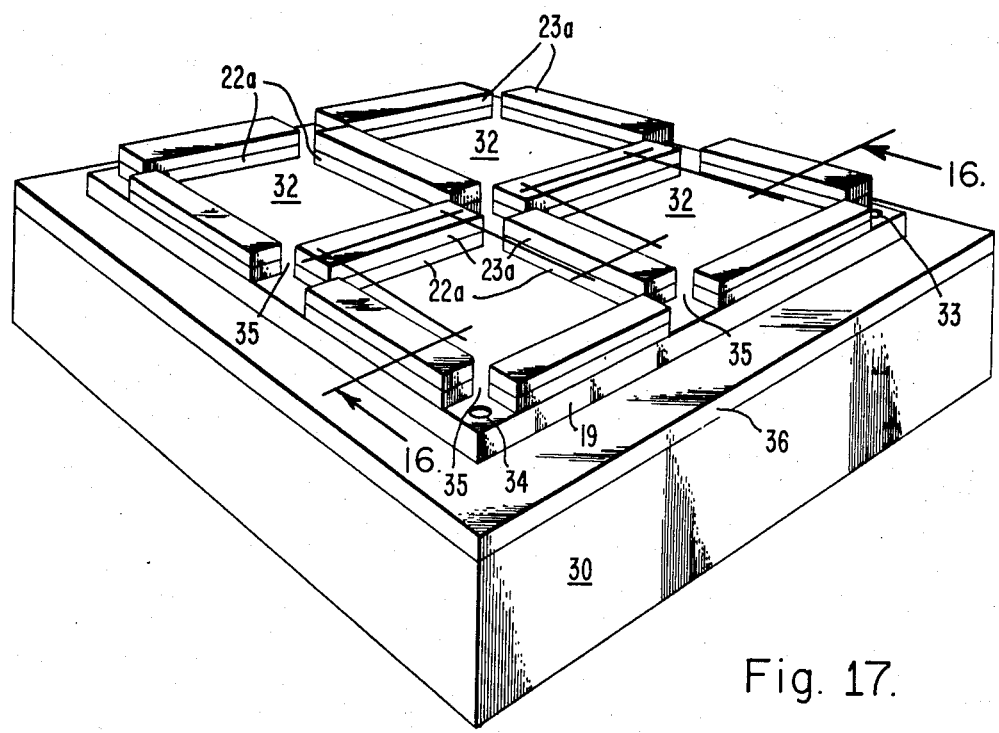

Referring to FIGS. 16 and 17 the remaining portions of layers 23 and 12, and remainder of substrate 11, had been broken off or cut away and removed, as shown. Another substrate 30 of electrically insulating material, such as glass, which may be overcoated with an electrically conductive and optically transparent layer 36, usually of indium-tin-oxide or other like suitable material is added. Such layer 36 provides a common ground plane for the illustrated cell, as well as providing a common ground plane for like cells in a matrix display array, in which case both substrate 30 and layer 36 would be continuous structure common to all such cells in the matrix. The common ground plane at 36 is where an electrical connection can be made to act as the signal and DC power return path for the electronics of chip 31. Layer 36 is optional, but absent such layer 36, a plurality of individual signal and DC power return connections from the electronics of chip 31 would have to be made. Of course, it should be realized that a plural number of connections (not shown) other than the common ground return, would be part of chip 31.

Prior to attaching substrate 30, layer 19 will be drilled to provide entry and exit ports for injection of a typical liquid crystal fluid into the cell. Substrate 30 and layer 36 will also have corresponding entry and exit ports. The fluid is injected at 33a through entry port 33 and flows through crevices 35 into liquid crystal cell areas 32. The fluid will disperse through areas 32, and when the device is completely filled with fluid, the excess fluid will pass through exit port 34 to be drained at 34a. Such drainage assures that air bubbles from the fluid are removed. When the liquid crystal cell is completed as shown in FIG. 17 (with chip 31 being illustrated in FIG. 16), then the ports at 34a and 34b are sealed.

Hence, the inventive membrane comprises substrate 19 and the cell rib structure consisting of epitaxial members 22a each having a silicon dioxide coating 23a, and may have a single rib as shown in FIG. 18, attached to and circumferential to layer 19, made of a similar epitaxial material as 22a having a similar silicon dioxide coating as 23a, to seal the edges of the cell.

Referring to FIG. 18, an additional circumferential lip for sealing the cell may be used instead of a conventional seal. Such lip has two portions 22b and 23b attached to each other, where portion 22b is attached to and integral with substrate 19. This lip may be made by the same process used to fabricate the rib structure consisting of layers 22a and 23a. Lip portion 22b is of the same material as layer 22a, and lip portion 23b is of the same oxide coating as layer 23a. When such lip is fabricated at the same time as the rib structure, and hence masks 25 and 26 shown in FiG. 9 will also include the lip pattern.

The use of the membrane with the rib structure therefore decreases the quantity of liquid crystal fluid in the cell and together with such decreased fluid, the combination of membrane and fluid has substantially the same thermal coefficient of expansion as the silicon chip material, with the attendant benefits hereinabove discussed.

We claim:

1. In a liquid crystal cell having an optically transparent faceplate coated with an optically transparent and electrically conductive film on a surface of the faceplate, said cell being adapted for use with a circuit formed in semiconductor material, said cell retaining liquid crystal material between the semiconductor material and the electrically conductive film, wherein the improvement includes a membrane comprising:

a generally flat semiconductor component having a pair of oppositely disposed first and second surfaces, said first surface being in contact with said film, and a rib structure having a plurality of spaced-apart semiconductor members, said rib structure being disposed between said second surface and said semiconductor material so as to define discrete cell areas and with said liquid crystal material being retained between the semiconductor rib members, whereby the thermal expansion of the combination of the membrane and the liquid crystal material substantially matches the thermal expansion of said semiconductor material, and the rib structure functions to constrain cell deformation and warpage and to isolate cell areas from one another.

2. The invention as stated in claim 1 wherein said membrane includes a circumferential seal for said cell integral with said semiconductor component.

3. The invention as stated in claim 2, wherein the semiconductor component is of a first conductivity type and said rib structure and circumferential seal are of a second conductivity type different from the first conductivity type, each of the semiconductor members and seal having an electrically insulating layer attached thereto.

4. The invention as stated in claim 1, wherein said liquid crystal material fills volumes between said membrane and semiconductor material.

5. The invention as stated in claim 1, wherein the semiconductor material is silicon.

6. The invention as stated in claim 1, wherein the semiconductor component is optically transparent.

7. The invention as stated in claim 1, wherein the rib structure is optically opaque.

8. The invention as stated in claim 1, wherein said liquid crystal material and semiconductor component enable light to be transmitted therethrough.

9. The invention as stated in claim 2, wherein the semiconductor component is of P+ material.

10. The invention as stated in claim 2, wherein each of the semiconductor members is an epitaxial layer of N-type material having an electrically insulating layer of silicon dioxide integral therewith.

* * * * *